United States Patent [19]

Markiewicz

[11] 4,223,581
[45] Sep. 23, 1980

[54] FEEDER APPARATUS FOR CABLE CUTTER

[75] Inventor: Jan Markiewicz, North Haven, Conn.

[73] Assignee: Combustion Engineering, Inc., Windsor, Conn.

[21] Appl. No.: 888,907

[22] Filed: Mar. 22, 1978

[51] Int. Cl.² ............................ B26D 4/46; G21F 9/36
[52] U.S. Cl. ............................................. 83/167; 83/277;
83/925 R; 53/522; 176/37; 252/301.1 W
[58] Field of Search ................. 252/301.1 W; 176/30,
176/37; 83/277, 167; 226/162, 167; 254/106, 29
R; 422/159; 53/522

[56] References Cited
U.S. PATENT DOCUMENTS

| | | | |
|---|---|---|---|
| 2,808,147 | 10/1957 | Moeltzner | 226/167 |
| 2,973,988 | 3/1961 | Goins | 254/29 R |
| 3,998,428 | 12/1976 | Miles | 254/29 R |
| 4,091,699 | 5/1978 | Chaze | 83/277 |

*Primary Examiner*—Benjamin R. Padgett
*Assistant Examiner*—Deborah L. Kyle
*Attorney, Agent, or Firm*—Arthur E. Fournier, Jr.

[57] ABSTRACT

An apparatus for forcefully feeding cabling in an underwater environment into a container includes a gripper block positionable above the container and an air cylinder for reciprocating the gripper block vertically. Jaws on the gripper block are pivoted to grasp the cabling when the gripper block is reciprocated downwardly but to release the cabling when the block is reciprocated upwardly. This permits forceful feeding of the cabling by mere reciprocation of the gripper block.

4 Claims, 4 Drawing Figures

FEEDER APPARATUS FOR CABLE CUTTER

BACKGROUND OF THE INVENTION

The present invention relates to the removal and storage of in-core instrumentation cabling during the refueling of a nuclear reactor. Various aspects of nuclear-reactor performance must be monitored by instrumentation that is located in the core itself. Due to the highly hostile environment of the core and the rather long refueling intervals, it can be expected that some of the instrumentations will have failed by the time a refueling is performed. In order to replace this instrumentation and to prevent as many future failures as possible, it is typical to replace much of the in-core instrumentation, both good and bad, during the refueling process. As is the case in many operations performed on nuclear reactors, the radiation environment significantly complicates the procedure, and the removal and storage of the instrumentation and its associated cabling must be performed remotely under water because water is used as a radiation shield. It is not enough that remote equipment is used to remove the instrumentation and cabling from the radioactive core; due to its exposure to radiation in the core, the instrumentation and cabling are themselves radioactive, so they cannot be handled directly by reactor personnel even after removal from the core. The cabling must be delivered to containers, the containers must be stored, and all this must be done under water and remote from human beings.

In the case of instrumentation cabling, this remote handling represents certain problems of time and expense. Among these is that, since it can be expected that the cabling will have assumed rather irregular shapes, only a few lengths of the cabling may fit in a given container. This is undesirable, of course, because storage area for radioactive material is always at a premium.

SUMMARY OF THE INVENTION

Accordingly, the present invention forcefully feeds cabling into a container, thereby increasing the amount of cabling that can be stored in a single container.

According to the present invention, which is an apparatus for cutting an elongated object into sections and loading it into a container, the container having first and second ends, the second end being oriented in a first direction from the first end, and the container forming an opening at the first end, a gripper block is provided that is locatable in a position in a second direction, opposite to the first direction, from the first end of the container. A first gripping surface is located on the gripper block, and a gripper jaw is also provided that comprises a second gripping surface, the first and second gripping surfaces being shaped to form, when in opposed relationship, an opening of such shape as to retain the object transversely when it extends longitudinally through the opening. The jaw is biased to urge the second gripping surface into opposed relationship with the first gripping surface and to grip the object between the gripping surfaces when the object extends longitudinally through the opening. The jaw is pivoted on a gripper block to be urged against the object in response to frictional force on the jaw caused by relative motion of the jaw with respect to the object in the first direction. However, it is pivoted to be urged away from the object in response to frictional force on the jaw caused by relative motion of the jaw with respect to the object in the second direction. Therefore, motion of the jaw in the first direction tends to grip the object and to move it in the first direction, while movement of the jaw in the second direction tends to release the object and to allow it to remain stationary as the jaw moves in the second direction. Means are provided for reciprocating the gripper block in the first and second directions so that the gripper block tends to feed the object into the container when it is located at a position at a second direction from the first end of the container and the object is positioned in the opening. Finally, means are provided for cutting the object at a point between the gripper jaw and the second end of the container so that a section of the object fed into the container can be separated from the rest of the object when a section of the object has been fed into the container.

According to the preferred embodiment of the invention, an inclined surface is fixed to the gripper jaw adjacent to the second gripping surface and inclined for wedging the second gripping surface far enough from the first gripping surface to permit the object to enter the opening when it is forced against the inclined surface toward the opening. Also, means may be provided for directing the object to the inclined surface and forcing it against the surface toward the opening once the object has been extended longitudinally through a predetermined aperture area, the object thereby being placed into the opening and transversely retained therein. The cutting means may comprise cutting jaws for cutting objects centered in the cutting jaws, and the apparatus can then further comprise means for centering the object in the cutting jaws.

DETAILED DESCRIPTION OF THE PREFERRED EMBODIMENT

Figure 1:
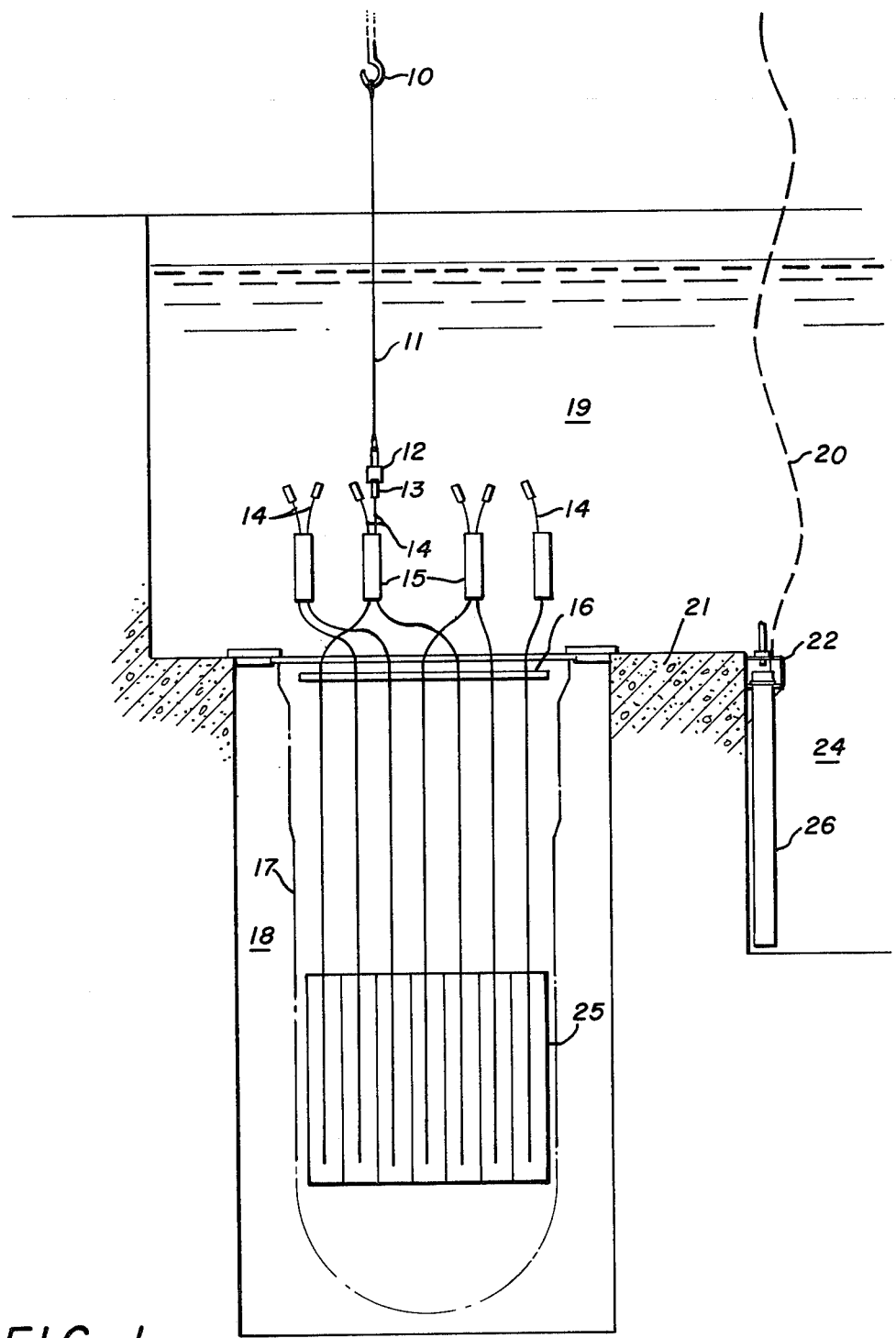
FIG. 1 is a simplified sectional view of a reactor cavity and an adjacent staging pool.

FIG. 1 shows a nuclear-reactor pressure vessel 17 mounted in a reactor cavity 18. The pressure vessel 17 is shown as it appears after the pressure head has been removed to expose various internals, including instrumentation cabling 14. The cabling 14 is positioned by guides 15, which are mounted by means not shown on a horizontal instrumentation plate 16 fitted in the vessel 17 near its top. An underwater staging area 24 is shown adjacent to the reactor cavity 18 and is separated from it by a section of the concrete foundation that forms a partition 21 between the staging area 24 and the reactor cavity 18. During refueling, the reactor cavity 18 is sealed so that the pool of water 19 that covers both the pressure vessel 17 and the staging area 24 is not allowed to leak into the reactor cavity 18. The depth of the pool 19 down to the reactor internals is substantial so that the pool may perform its shielding function during refueling.

An overhead crane, indicated by a crane hook 10, is provided and is used for removal of instrumentation cabling 14 from the reactor. The instrumentation cabling 14 extends down into the core 25 during reactor operation so that instrumentation embedded in the cabling may monitor the core. The cabling is thus radioactive after use in the reactor, so it requires protective storage. A withdrawal cable 11 extends down from the crane hook 10 and is attached to one of the cables 14 by means of a nut adaptor 12 that can be secured to a connector 13 on the end of each cable 14. The crane can move a cable 14 into the position indicated by the dotted line 20.

The apparatus 22 of the present invention is mounted on the partition 21 inside the staging area 24 for use in loading a container 26 that fits into and extends below the apparatus 22. The shape of the container 26 is the same as that of a fuel assembly. This enables manipulating equipment (not shown in the drawings) that has been designed for use with fuel assemblies to be used on the container 26.

Generally speaking, the crane 10 extracts a cable 14 and its attached instrumentation by means of the withdrawal cable 11 and delivers it to the apparatus 22 of the present invention. The apparatus 22 grabs the cabling and forcefully feeds it into the container 26. Due to the irregular shape that the cabling can be expected to take, this forceful feeding of the cabling is desirable because it increases the amount of cabling that can be fitted into each container 26. The cable is cut to lengths approximately equal to that of the container, and successive lengths are fed into the container 26 until it is full.

Figure 2:
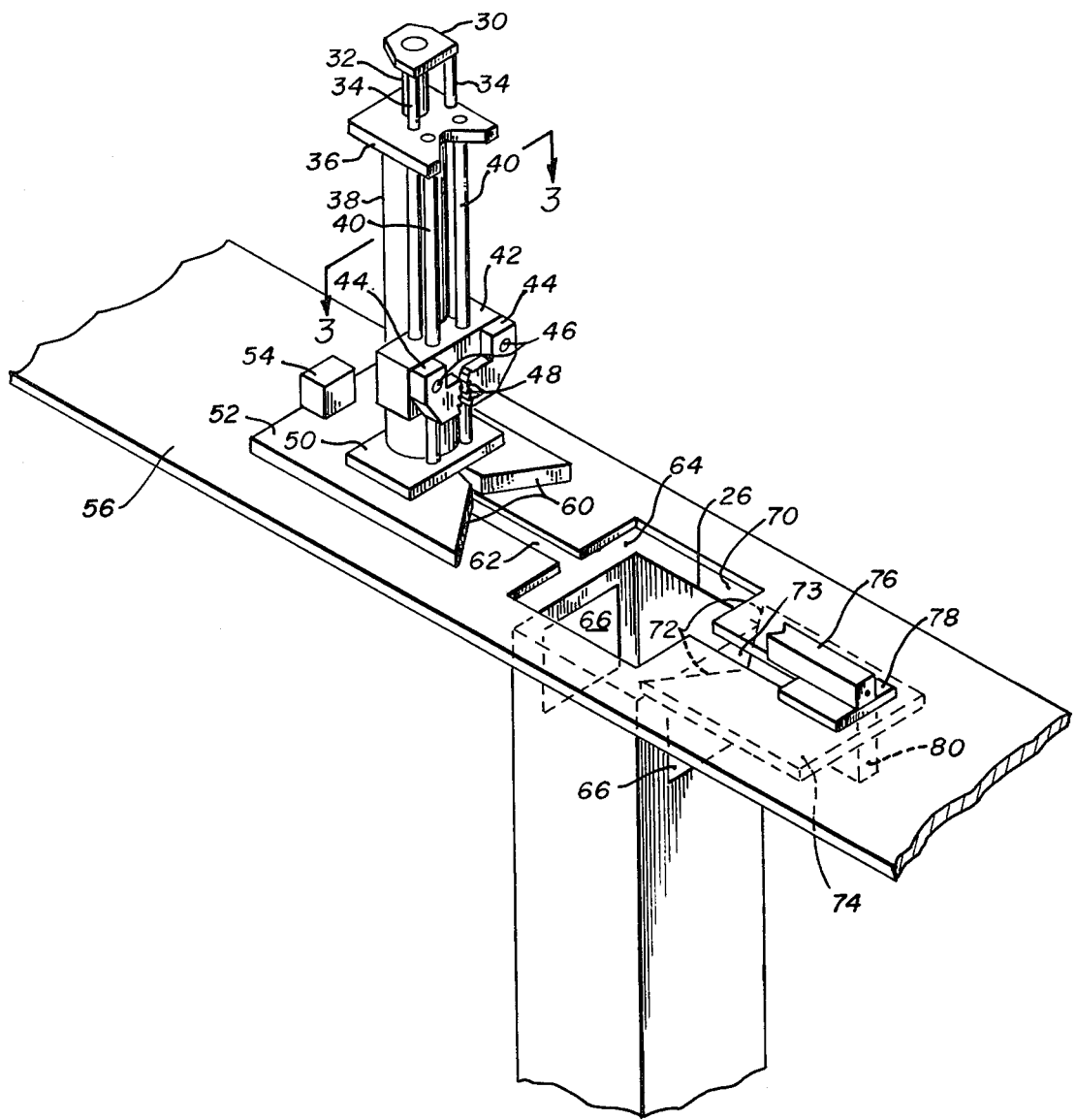
FIG. 2 is a somewhat simplified perspective view of the apparatus of the present invention.

A somewhat simplified perspective view of the apparatus 22 of FIG. 1 is shown in FIG. 2. A base plate 56 extends in a horizontal plane and by means not shown in FIG. 2 is connected by the side facing the upper right-hand corner of FIG. 2 to the partition 21 of FIG. 1. A slide plate 52 is mounted in a slot 62 formed in the base plate 56 for movement of the slide 52. Means not shown in FIG. 2 for moving the slide plate 52 are connected to a connector block 54 mounted on the rear of the slide plate 52. A feeder base plate 50 is mounted on the slide plate 52 and serves as an anchor for an air cylinder 38 that extends vertically up from the feeder base plate 50. The top end of the air cylinder 38 is attached to a guide plate 36 that is penetrated by a piston rod 32. The piston rod 32 is driven by the air cylinder 38. A cantilever bracket 30 is mounted on the top of the piston rod 32, and two drive rods 34 are connected to the cantilever bracket 30 and extend downward to a gripper block 42 located between the feeder base plate 50 and the guide plate 36. The drive rod 34 slidably penetrates the guide plate 36 and is rigidly attached to the gripper block 42 so that reciprocation of the cantilever bracket 30 by the piston rod 32 causes reciprocation of the gripper block 42 but no movement of the guide plate 36. Guideposts 40 extend vertically between the feeder base plate 50 and the guide plate 36 and are attached to them. The guideposts 40 slidably penetrate the gripper 42, their purpose being to guide the gripper block 42 during reciprocation by the air cylinder 38.

Gripping surfaces 48 are located on the gripper block 42 through the provision of jaws 44 that are mounted on the gripper block 42 by means of pivot pins 46. The purpose of the gripping surfaces 48 is to bite into cabling located between them, and it can be seen that the jaws 44 are pivoted on the pivot pins 46 in such a manner as to be urged against the cabling in response to the frictional force caused by relative motion of the jaw with respect to the cabling when the gripper block 42 is moving downward. However, when the gripper block 42 is moved upward, the frictional force tends to cause the jaw to be urged away from the cabling, so downward motion of the gripper block tends to cause gripping of the cabling, while upward motion tends to cause its release.

A second slide plate 74, shown in phantom in FIG. 2, is slidably mounted beneath the base plate 56 for travel along a second slot 73 formed in the base plate 56. It is connected through the slot 73 to a slide support plate 78, which both provides vertical support to the second slide plate 74 and serves as a base for mounting an upper ram 76 that is arranged to move with the slide plate 74.

The base plate 56 has an opening 64 formed therein through which the container 26 may be lowered into the proper place for receiving instrumentation cabling. The container 26 is shown in FIG. 2 in the position it assumes after it has been lowered through the opening 64. It is to be noted that the container 26 is vertically spaced below the base plate 56 to allow a clearance space 70 for passage of the second slide plate 74. Also to be noted is that the container 26 has openings 66 formed therein at opposite sides thereof so that a cutter mounted below the feeder assembly may cut instrumentation cabling into pieces whose tops are not higher than that of the container 26.

Though not shown in FIG. 2, an air cylinder of conventional design is connected to the connector block 54 and mounted on the base plate 56 so as to provide for movement of the slide plate 52. Similar provision is made for movement of the other slide plate 74. It can be seen that the gripper block 42 can be located, through movement of the slide plates 52 and 74, in a position above the container 26, and the leading surfaces 60 and 72 of the slide plates can direct an elongated object such as the cabling toward the opening formed by the gripping surfaces 48 if the object extends longitudinally through an aperture area defined by the opening 64. This directing of the cabling toward the gripping surfaces enables the upper ram 76 to force the cabling against inclined surfaces (described below in connection with FIG. 3) fixed to the gripper jaws 44 and thereby cause the jaws to open and allow the cabling to enter the opening formed between them.

Figure 3:
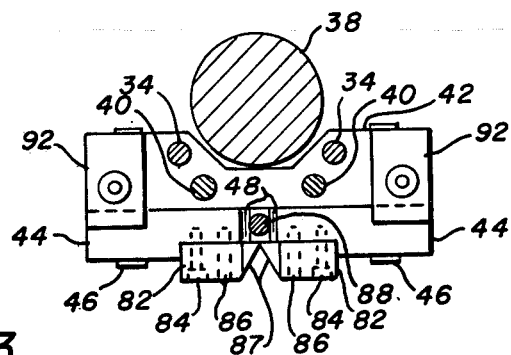
FIG. 3 is a simplified sectional view taken at line 3—3 of FIG. 2.

FIG. 3 is a sectional view taken at line 3—3 of FIG. 2. The view has been simplified by the removal of all parts in FIG. 2 below the jaws 44. Since parts are numbered as in FIG. 2, description of duplicated parts will not be repeated.

Tapered guide inserts 82 are located by locating pins 86 on the front of the jaws 44 and are held in place by screws 84. The guide inserts 82 provide inclined surfaces 87 adjacent to the gripping surfaces 48. The surfaces 87 are inclined for wedging the gripping surfaces 48 apart when the instrumentation cabling is forced against them by the upper ram 76 of FIG. 2. The inclined surfaces 87 are so arranged that the gripping surfaces 48 are wedged far enough apart to permit the cabling to enter the opening formed by the gripping surfaces 48. A section of cabling 88 is shown positioned in the opening formed by the gripping surfaces 48, and it can be seen that this opening is of such shape as to retain the cabling transversely. In order to bias the gripping surfaces into opposed relationship so that they will grip the cabling 88, the jaws 44 are biased by spring-loaded straps 92.

Figure 4:
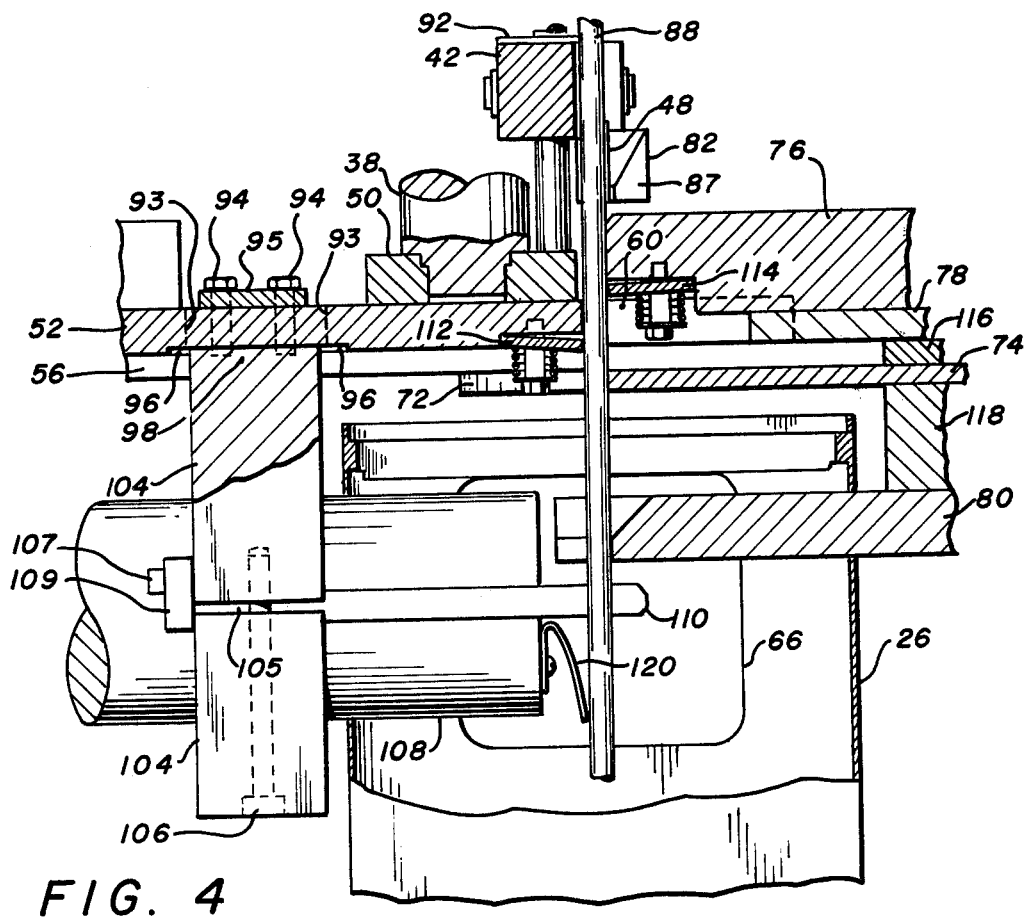
FIG. 4 is predominantly a vertical section of part of the apparatus in the neighborhood of the opening in the base plate in FIG. 2.

FIG. 4 is predominantly a vertical section of the apparatus in an area around the opening 64 in the base plate 56. The section is taken at a vertical plane through the slots 62 and 73 (FIG. 2), so the base 56 is seen as an edge rather than in section. The first slide plate 52 is shown lying on the base plate 56. The slide plate 52 begins at the left end of the drawing and is shown in section as it extends toward the cable 88. A small portion 96 on the lower surface of the slide 52 is shown on edge. This represents a groove machined in the lower surface of the slide 52. The groove has a length and thickness as seen in FIG. 4 and a width slightly less than that of the left slot 62. To the right of the cable 88, the forward surface 60 of the slide 52 is shown on edge and terminates in phantom behind the ram 76 and the slide support plate 78.

A support plate 95 straddles two slots formed in the slide plate 52, one of which is depicted by dotted lines 93. The support plate 95 rests on the slide plate 52 between and on either side of the slots in the plate. Bolts 94 penetrate the support plate 95 and extend through the slots 93. They engage tapped holes in the upper extension 98 of the top half of cutter brackets 104 that are adapted for holding a conventional cutter 108. The upper extension 98 is just narrow enough to fit snugly in the groove 96 in the direction in and out of the page, but it is somewhat shorter than the groove 96 in the direction of motion of the slide. This arrangement centers extension 98 for easy movement along the slot 62 but permits adjustment of the cutter position in the direction of motion.

The brackets 104 themselves are only shown partly in section, their major part, along with the cutter 108, being shown as a vertical elevation. The brackets 104 widen below the upper extension 98 and form a circular opening to accommodate the circular cross-section of the cutter 108. The brackets are held together by bolts 106 to clamp the cutter 108, and radiation shields 109 would typically be attached to the brackets 104 by means of a bolt 107 in order to shield the cutter circuitry from radiation passing through the opening 105 between the brackets. A spring 120, whose purpose is explained below, is attached to the cutter 108.

The cutter 108 includes conventional cutting jaws 110, and it is shown penetrating a hole in the side of the container 26. Another hole 66 in the container 26 is shown perpendicular to that penetrated by the cutter 108, and this representation is somewhat inconsistent with that of FIG. 2. While the two holes shown in FIG. 2 are sufficient by themselves for operation of the present invention, it is thought that it would be more typical for the container 26 to have four openings 66, rather than just two, so that no orientation problems will be encountered.

The second slide plate 74 is shown in an orientation complementary to that of the first slide plate 52, the portion to the right of the cable 88 being shown in section, while the edge of its forward surface 72 is shown to the left of the cable 88. Both slides 52 and 74 are in their fully centered positions, so they have directed the cable 88 toward the inclined surfaces 87. The second slide plate 74 is fixed to a spacer plate 116 that fits through the slot 73 (FIG. 2) and is in turn connected to the slide support plate 78. The ram 76 is mounted on the slide support plate 78. Beneath the second slide 74 is positioned a spacer block 118, which connects the second slide 74 to a lower ram 80. The lower ram 80 is seen extending to the left. It has a V-shaped front surface, which is seen from the side. As is apparent from FIG. 4, the cable 88 that was directed toward the inclined surfaces 87 has been forced by the upper ram 76 through the inclined surfaces 87 and into the opening formed by the gripping surfaces 48. The lower part of the cable 88 has been centered in the cutter jaws 110 by the lower ram 80.

In order to prevent upward motion of the cable 88 while the gripper block 42 is being reciprocated upwardly, spring-loaded auxiliary jaws 112 and 114 are provided. Auxiliary jaw 112 is mounted in a slot machined in the lower surface of the slide plate 52 at the vertex of its V-shaped leading surface 60. The spring loading biases the auxiliary jaw 112 to urge gripping surfaces on the right edge of the auxiliary jaw 112 against the cable 88. The auxiliary jaw 112 is pivoted at its left end so as to be urged against a cable in response to frictional force on the jaw caused by the relative motion of the cable 88 in the upward direction but to be urged away from the cable in response to frictional force on the jaw caused by relative motion of the cable 88 in a downward direction. The other auxiliary jaw 114 is mounted in a slot machined in the lower side of the ram 76 at the vertex of its V-shaped surface, and it is biased and pivoted in a manner similar to that in which auxiliary jaw 112 is. The result of this arrangement is that when the gripper block 42 is being moved upward, auxiliary jaws 112 and 114 grip the cable, preventing it from also moving upward. However, when the gripper block moves downward, the cable tends to pivot the auxiliary jaws 112 and 114 away from it, thereby allowing it to move in the intended downward direction.

When it is desired to store the used instrumentation cable, the crane 10 positions the free end of the cable in the aperture area defined by the opening 64 in the base plate 56. The air cylinders connected to the slides 52 and 74 are then activated, and the V-shaped leading surfaces 60 and 72 of the slides 52 and 74, respectively, are brought together, directing the cable toward the inclined surfaces 87 on the guide plates 82. As the cable becomes centered and movement of the slides 52 and 74 continues, the rams 76 and 80 engage the cable. The upper ram 76 forces the cable against the inclined surfaces 87, wedging the gripping surfaces 48 far enough apart to permit the cable to enter the opening formed between them. Simultaneously, the lower ram 80 centers the cable in the cutter jaws 110. When the cable has been forced all the way into the opening, it no longer engages the guide plates 82, and the jaws 44 snap into engagement with it due to the biasing force provided by the spring-loaded straps 92. The auxiliary jaws 112 and 114 are also forced into engagement with the cable due to the movement of the slides 52 and 74.

In addition to directing and engaging the cable, the movement of the slides also positions the gripper block 42 directly above the container 26, so it reaches the appropriate position for feeding the cable into the container 26. At this point, the air cylinder 38 is in its retracted, or downward, position, so the upper ram 76 is relatively close to the jaws 44. Though the upper ram 76 is not directly opposite the jaws 44, the stiffness of the instrumentation cabling enables enough force to be transmitted to the guide plates 82 to part the jaws 44.

The air cylinder 38 is actuated once the cable has been positioned, and the gripper block 42 is forced to move upward. The frictional force on the gripper jaws 44 due to their movement with respect to the cable causes them to be urged apart, loosening their hold on the cable 88. Simultaneously, the frictional force on the auxiliary jaws 112 and 114 causes them to be urged against the cable, thereby tightening their hold on it and preventing it from accompanying the gripper block 42. When the air cylinder 38 reaches the upper end of its travel, it is actuated in the downward direction, and the frictional force on the gripping surfaces 48 causes them to be urged against the cable 88, while the frictional force on the auxiliary jaws 112 and 114 causes their grip to be loosened. As a result, the cable is forcefully fed into the container 26.

This operation is repeated until the cabling reaches the lower end of the container 26 or until the upper end of the cable 88, where the connector 13 is positioned, is detected by means not discussed here. When either event occurs, the cutter 88 activates cutting jaws 110, which cut the cable to the appropriate lengths. The spring 120 then acts to push aside the rest of the cable in the container 26 so that successive lengths of cable can be forcefully fed into the container 26. If the connector has not been detected, another length of cabling is fed as before, and this operation is repeated until the end of the cable is reached. Then the air cylinder raises the gripper block 42 all the way, and screws not shown in the drawing which extend down from the guideplate 36, engage the jaws 44 in such a manner as to open them and allow the cabling to be removed.

Through the use of the apparatus, the sometimes irregularly-shaped cables can be packed in containers with maximum density, thereby reducing the amount of radioactive-storage space required for them and eliminating some of the time required for their handling.

What is claimed is:

1. An apparatus for effecting the forceful feeding of an elongated object and the subsequent cutting from the elongated object of a portion thereof comprising:
   a. a base including a pair of spaced surfaces, said base having an opening provided therein, said opening extending between said pair of spaced surfaces;
   b. a container cooperatively associated with said base for receiving therewithin a portion of the elongated object, said container having an open end and a closed end and a pair of openings formed therein adjacent said open end, said container being detachably supported with said open end thereof aligned with said opening in said base;
   c. gripper support means supported on one of said pair of spaced surfaces of said base for movement relative thereto, said gripper support means being slidably movable into and out of alignment with said opening in said base and thereby into and out of alignment with said open end of said container;
   d. a gripper block supported on said gripper support means for movement therewith, said gripper block further being supported on said gripper support means for reciprocal movement relative thereto towards and away from said open end of said container in a plane defined by the feed path of the elongated object, said gripper block including a first gripping surface and a second gripping surface, said first and second gripping surfaces together cooperatively defining an opening therebetween for receiving the elongated object therewithin, said gripper block being operative when the elongated object is positioned in the opening formed by said first and second gripping surfaces to effect the forceful feeding into said open end of said container through said opening in said base of at least a portion of the elongated object as said gripper block moves axially towards said open end of said container;
   e. cutting means mounted on said gripper support means for movement therewith, said cutting means including cutting jaws supported in spaced relation to the other of said pair of spaced surfaces of said base, said cutting jaws being movable as said cutting means moves relative to said gripper support means between a first position wherein said cutting jaws project into the interior of said container through one of said pair of openings formed in said container and a second position wherein said cutting jaws are positioned outwardly of said container, said cutting jaws being operative when located in said first position thereof to effect the severing from the elongated object of the portion thereof located within said container at a point located along the length of the elongated object intermediate said open end and said closed end of said container; and
   f. ram means supported on said one of said pair of spaced surfaces of said base for movement relative thereto in a direction perpendicular to the feed path of the elongated object, said ram means including a first ram movably mounted in spaced relation to said one of said pair of spaced surfaces of said base and a second ram movably mounted in spaced relation to said other of said pair of spaced surfaces of said base, said first and second rams each being movable between a first position wherein said first and second rams are each in engagement with the elongated object and a second position wherein said first and second rams are each disengaged from the elongated object, said first ram being operative when in said first position thereof to effect the insertion of the elongated object into the opening formed by said first and second gripping surfaces, said second ram when located in said first position thereof projecting into the interior of said container through the other of said pair of openings formed in said container and being operative when so positioned to effect the centering of the elongated object in said cutting jaws.

2. The apparatus as set forth in claim 1 wherein said second gripping surface comprises a gripper jaw, and said gripper block further includes biasing means biasing said gripper jaw towards said first gripping surface and pivot means pivotally mounting said gripper jaw on said gripper block, said pivot means being operable when the elongated object is positioned in the opening formed by said first and second gripping surfaces to urge said gripper jaw into gripping engagement with the elongated object in response to the frictional forces that are applied to said gripper jaw when there is relative motion between said gripper jaw and the elongated object in a first direction and to urge said gripper jaw out of gripping engagement with the elongated object in response to the frictional forces that are applied to said gripper jaw when there is relative motion between said gripper jaw and the elongated object in a second direction.

3. The apparatus as set forth in claim 2 further including auxiliary jaw means supported on said base for preventing movement of the elongated object when said gripper block reciprocates away from said open end of said container, said auxiliary jaw means including a first jaw movably mounted in spaced relation to said one of said pair of spaced surfaces of said base and a second jaw movably mounted in spaced relation to said other of said pair of spaced surfaces of said base, said first and second jaws each being movable into engagement with the elongated object, said first and second jaws when in engagement with the elongated object being urged into gripping engagement with the elongated object to prevent movement of the elongated object in response to the frictional forces applied to said first and second jaws when said gripper block reciprocates away from said open end of said container and being urged out of gripping engagement with the elongated object to permit movement of the elongated object in response to the frictional forces applied to said first and second jaws when said gripper block reciprocates towards said open end of said container.

4. The apparatus as set forth in claim 3 wherein said cutting means further includes spring means mounted for movement with said cutting jaws between said first and second positions of said cutting jaws, said spring means projecting into the interior of said container through said one of said pair of openings formed in said container when said cutting jaws are located in said first position thereof and being operative to push aside the severed portion of the elongated object from the feed path of the elongated object to provide in said container room for a succeeding portion of the elongated object to be forcefully fed into said container.

* * * * *